United States Patent
McRay

[11] 3,782,478
[45] Jan. 1, 1974

[54] FLUID CONTROL SYSTEM FOR EARTHWORKING APPARATUS INCLUDING AUTOMATIC PRESSURE REGULATING MEANS

[75] Inventor: Ferris L. McRay, Springfield, Ill.

[73] Assignee: Allis-Chalmers Corporation, Milwaukee, Wis.

[22] Filed: Mar. 2, 1973

[21] Appl. No.: 337,532

Related U.S. Application Data

[62] Division of Ser. No. 140,698, May 6, 1971.

[52] U.S. Cl. .................... 172/4.5, 60/97 P, 91/414, 172/793
[51] Int. Cl. .............................................. E02f 3/76
[58] Field of Search ................. 172/4.5, 781, 791.7; 60/97 P; 91/414; 37/DIG. 20

[56] References Cited
UNITED STATES PATENTS

| | | | |
|---|---|---|---|
| 2,655,743 | 10/1953 | Ross.................................... | 172/793 |
| 3,233,909 | 2/1966 | Boone................................. | 172/4.5 |
| 2,319,551 | 5/1943 | Linden et al. ...................... | 60/97 P |

Primary Examiner—Stephen C. Pellegrino
Attorney—Charles L. Schwab et al.

[57] ABSTRACT

The control box jaw clutches of a motor grader are hydraulically operated through parallel connected closed center control valves. An automatic pressure regulator is interposed between the source of pressurized fluid and the parallel connected inputs to the control valves. When all the control valves are in neutral, an unloading valve in the pressure regulator bypasses fluid flow from the pressure source to the reservoir at a moderate pressure. When any one of the control valves is moved to an operating position, the unloading valve is automatically conditioned to establish a higher operating pressure. The higher operating pressure is established by hydraulically biasing the unloading valve fluid flow control element by pressurized fluid delivered to the jaw clutch actuators by the associated control valve. Upon the controlled apparatus moving to a limit position, a dumping valve is opened, thereby reducing the pressure to the jaw clutch actuator allowing the centering spring in the jaw clutch mechanism to return it to neutral position even though its control valve is still in an operating position. The reduction in control valve operating pressure, resulting from opening of the dumping valve, reduces the fluid pressure bias on the unloading valve flow control element thereby reducing the bypass pressure level until the 100 psi level is re-established. Fluid bypassed by the unloading valve element is delivered to an auxiliary control valve circuit having a high pressure relief valve. A pressure limiting valve downstream of the unloading valve prevents the jaw clutch control circuits from being subjected to more than an intermediate pressure.

2 Claims, 4 Drawing Figures

FLUID CONTROL SYSTEM FOR EARTHWORKING APPARATUS INCLUDING AUTOMATIC PRESSURE REGULATING MEANS

This is a division, of application Ser. No. 140,698 filed May 6, 1971.

SUMMARY OF THE INVENTION

The present invention provides an automatic pressure regulating means in the hydraulic control system for position adjusting mechanisms used to selectively position earthworking apparatus wherein an unloading valve bypasses fluid at a low pressure level when all the jaw clutch control valves are in neutral and provides pressure at an intermediate level when any one of a plurality of closed center control valves is shifted to an operating position. The flow control element of the unloading valve is again conditioned to bypass at the low pressure level when the motion transmitting means has adjusted the earthworking apparatus to a predetermined position. At the low pressure level the position adjusting means is neutralized. The fluid bypassed by the unloading valve may be used to operate auxiliary equipment at a high pressure level; in which case, a protective pressure limiting valve limits the pressure to the control valves for the jaw clutches at substantially the beforementioned intermediate pressure level.

DESCRIPTION OF THE PREFERRED EMBODIMENT

Figure 1:
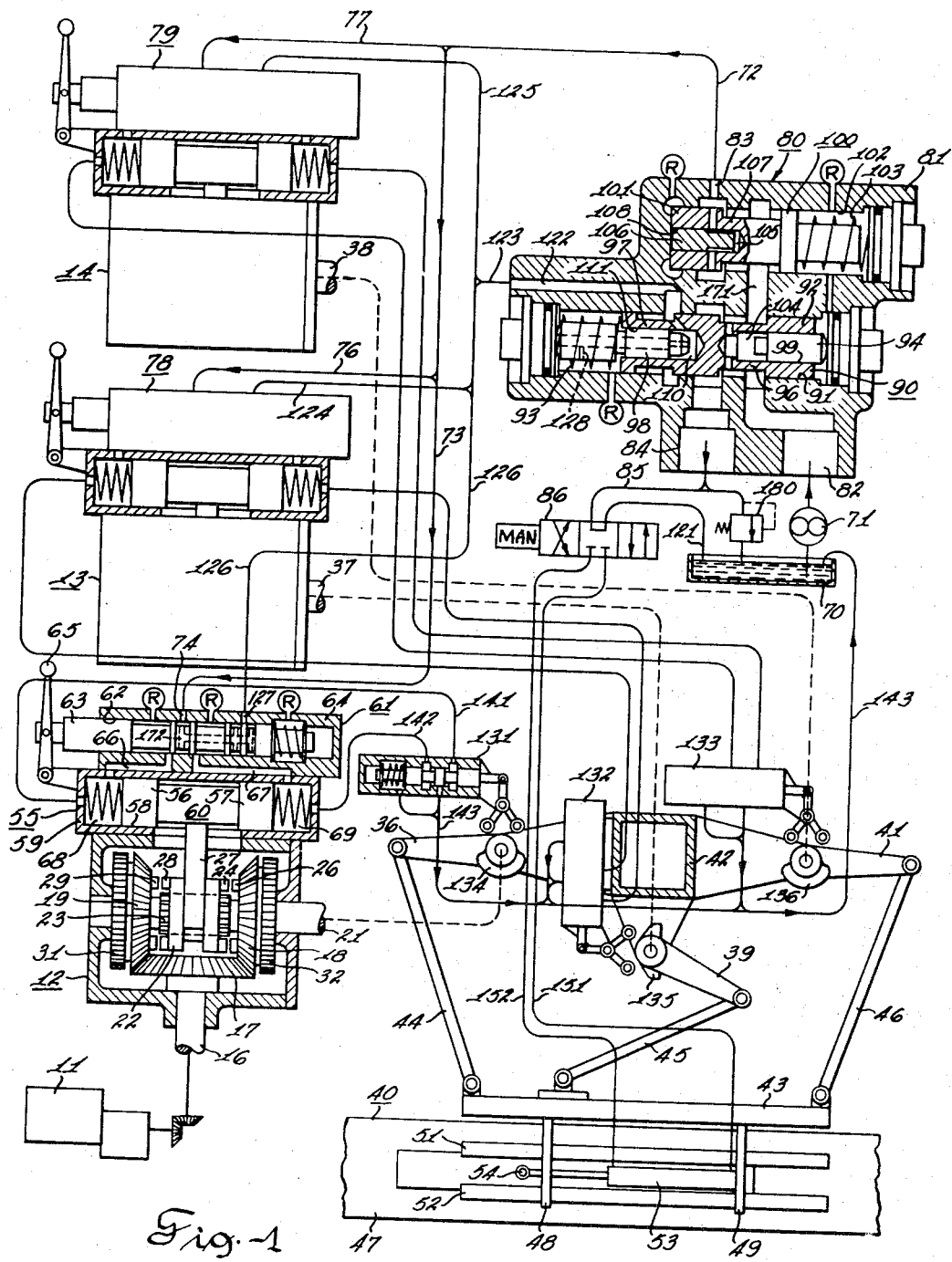
FIG. 1 is a schematic view of a motor grader control system in which the present invention is incorporated with some components shown in section for illustration purposes.

Referring to FIG. 1, the invention is incorporated in a motor grader powered by a suitable engine 11 which supplies power to control boxes 12, 13, 14 through a power take-off shaft 16. An input bevel gear 17 is connected for rotation with power take-off shaft 16 and meshes with bevel gears 18, 19 rotatably mounted on a power transmitting output shaft 21. A double-acting jaw clutch is provided in each control box to control power delivered to output shafts 21, 37, 38. The double-acting jaw clutch for control box 12 includes a sleeve 22 having a sliding spline connection with the output shaft splined portion 23 intermediate the bevel gears 18, 19. Upon movement of the sleeve 22, by a yoke 27, to the right, teeth 24 on the sleeve 22 mesh with teeth 26 on gear 18, thereby effecting rotation of the shaft 21 in a first direction. Upon shifting of the sleeve 22, by the yoke 27, to the left, teeth 28 on the sleeve 22 will engage teeth 29 on bevel gear 19 thereby causing the shaft 21 to be rotated in an opposite direction. The control boxes 12, 13, 14 are located in side-by-side relation at the operator's station of the motor grader and are connected to the power take-off shaft 16 through spur gears 31, 32 which drive corresponding gears in the adjacent control box through idlers, not shown. The control boxes 13 and 14 are similar to box 12 except that the gears corresponding to gears 31, 32 do not have integrally formed therewith bevel gears corresponding to bevel gears 18 and 19, nor do the control boxes 13, 14 include an input bevel gear like gear 17.

The output shaft 21 of control box 12 is connected to a control arm 36 for earthworking apparatus in the form of a blade assembly 40 through a worm-and-gear set, not shown. In a similar manner, the output shafts 37, 38 of control boxes 13, 14 are connected to control arms 39, 41. The control arms 36, 39, 41 are pivotally connected to the main frame 42 of the motor grader on separate longitudinal axes and have their swinging ends pivotally connected to a circle structure 43 of blade assembly 40 through links 44, 45, 46. The control boxes and their associated control arms and links serve as position adjusting means for the moldboard assembly. The circle structure 43 supports a shiftable moldboard 47 through downwardly extending arms 48, 49 which carry a pair of guides 51, 52 on which the moldboard may be shifted by a double-acting hydraulic jack 53. The jack 53 has its closed end connected to arm 49 and its rod end connected to a pin 54 on the moldboard 47.

The control box 12 includes a double-acting hydraulic actuator 55 which includes a piston 60 having piston portions 56, 57 and a bore 58 in the actuator housing 59. The piston 60 and bore 58 define a pair of pressure chambers 68, 69. The yoke 27 is secured as by welding to the piston 60. In the neutral position illustrated in FIG. 1, both of the actuator pressure chambers 68, 69 are connected to reservoir 70 and a pair of centering springs bias the piston 60 to its illustrated neutral position. The hydraulic actuator 55 is controlled by a closed center control valve 61 having a flow control member in the form of a spool 63 shiftable in a bore 62 in a valve housing 64 secured to the top of the actuator housing 59.

The flow control member 63 is shiftable in either direction from its illustrated neutral position to operating positions by a manual operating lever 65. A pair of operating passages 66, 67 in the valve housing 64 extend between the bore 62 and the pressure chambers 68, 69.

Pressurized fluid is supplied to the control valve 61 by an engine driven pump 71 by way of a main supply conduit 72 and branch conduit 73 connected to an inlet passage 74 in the valve housing 64. Branch conduits 76, 77 similarly connect control valves 78, 79 to main conduit 72 in parallel with control valve 61.

In order to regulate the pressure level of fluid supplied to the control valves 61, 78, 79, an automatic pressure regulator 80 is provided which includes an unloading valve 90 and a pressure limiting valve 100. The regulator 80 has a housing 81 with an inlet passage 82 receiving pressurized fluid from the pump 71 and an outlet passage 83 connected to the main conduit 72. The regulator housing 81, which constitutes housings for both of the valves 90 and 100, also includes a bypass port 84 through which fluid is bypassed to an auxiliary circuit for controlling a side shift jack 53. The auxiliary circuit includes an open center valve 86 connected to the bypass port 84 by a conduit 85, a pair of delivery conduits 151, 152, a relief valve 180 and return-to-reservoir conduit 121.

Figure 2:
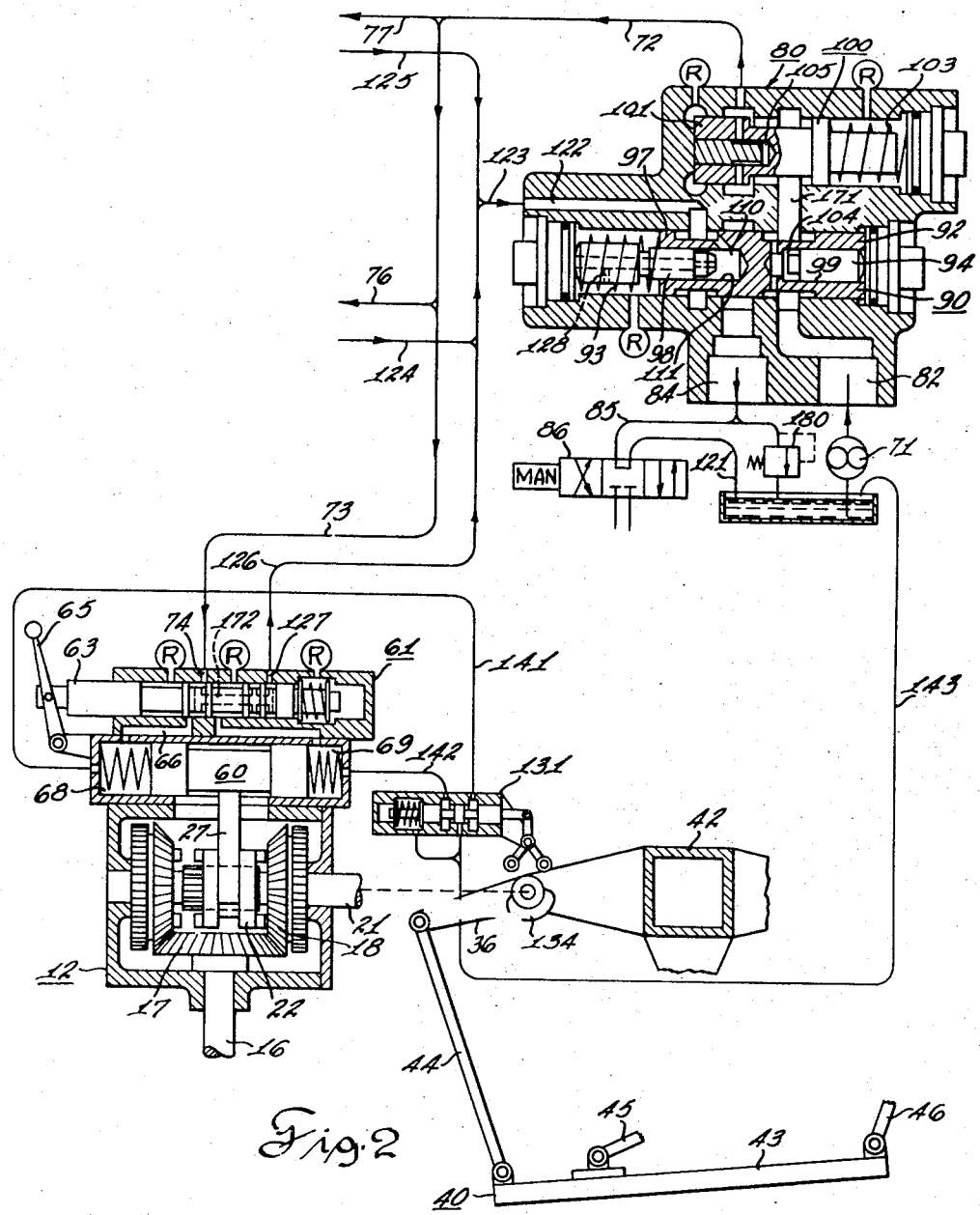
FIG. 2 shows one of the jaw clutch control valves in an operating position, and the automatic pressure regulator maintaining the pressure at an intermediate pressure level.

A bore 91 formed in the housing 81, receives a flow control element in the form of a spool 92 which is reciprocably shiftable from a closed position as shown in FIG. 2 to an open position as shown in FIG. 1. The spool 92 is biased to the right toward its closed position by a coil spring 93, is biased to the left toward its open position by a hydraulic actuator formed by cylindrical part 96 of spool 92 and a piston 94, and is biased to the right by a hydraulic actuator formed by a cylindrical part 97 of spool 92 and a piston 98. A bore 99 in the spool 92 and the piston 94 define a pressure chamber 104 in constant fluid communication with the output side of the pump 71. A bore 111 and the piston 98 form a pressure chamber 110 which is in constant communication with a passage 122 connected to control valves 61, 78, 79 by a main conduit 123 and branch conduits 126, 124, 125.

The pressure limiting valve 100 includes a spool 101 shiftably positioned in a bore 102 formed in the housing 81. A passage 171 in housing 81 serves as the inlet port for valve 100 and interconnects the bores 102 and 91 to place the pressure limiting valve 100 in constant communication with the output of pump 71. The spool 101 is biased toward an open position by a coil spring 103 and is biased toward a closed position by a fluid actuator comprising a cylinder part 107 of the valve element 101 presenting a bore 108 and a piston 106 reciprocably mounted therein. The bore 108 and piston 106 define a pressure chamber 105 which is in constant communication with main conduit 72.

OPERATION OF THE ILLUSTRATED EMBODIMENT

Referring to FIG. 1, pressure fluid delivered by the pump 71 is bypassed to the bypass port 84, passes through conduit 85 and then flows through the open center control valve 86 back to the reservoir 70 by way of return line 121. The spool 92 of the unloading valve 90 opens to the position illustrated upon the pressure in chamber 104 reaching a moderate level, such as 100 psi, which is sufficient to overcome the force exerted by spring 93. Fluid delivered by the pump 71 is returned to the reservoir 70 at low pressure so long as the control valves 61, 78, 79 and auxiliary valve 86 remain in their illustrated neutral condition. In the illustrated neutral condition of the jaw clutch control valves, fluid is blocked by their flow control members, and there is no flow through the branch conduits 73, 76, 77. The pressure chamber 110 of the hydraulic actuator at the left end of unloading valve 90 is connected by a passage 122, main conduit 123, and branch conduit 126 to regulating port 127 in the control valve 61. Similar ports in control valves 78, 79 are connected to branch conduits 124, 125. A bleed passage 128 in piston 98 insures that there is no substantial pressure in chamber 110 when the control valves 61, 78, 79 are in their neutral positions.

Dumping valves 131, 132, 133 are mounted on the earthworking vehicle and operatively positioned in relation to cams 134, 135, 136 on the control arms 36, 39, 41, respectively, whereby fluid will be bypassed from the actuating chambers of the control boxes 12, 13, 14 upon limit positions being reached in either direction of rotation by the respective control arms 36, 39, 41. Dumping valve 131 is connected to the jaw clutch actuator chambers 68, 69 by conduits 141, 142 and to the reservoir 70 by conduit 143.

Referring to FIG. 2, the flow control member 63 has been shifted to the left to an operating position by a manually operated lever 65. Pressure fluid delivered by pump 71 passes by way of the pressure regulator 80 to operating passage 66 in the control valve housing 61 pressurizing chamber 68. The chamber 69 is connected to reservoir. The pressure increase in chamber 68 will move piston 60 to the right to the position illustrated in which yoke 27 has moved sleeve 22 into coupled relationship with gear 18. This will cause the lift arm 36 to be rotated in a counterclockwise direction as viewed in FIG. 2.

As shown in FIG. 2, pressurized fluid delivered to branch conduit 73 also passes by way of passage 172 in flow control member 63 to the regulating port 127 and thence by way of branch conduit 126, main conduit 123, and passage 122 to the actuator chamber 110. The fluid pressure in chamber 110 causes the unloading valve element 92 to shift to its closed position to achieve an intermediate pressure level in the main supply conduit 72.

Figure 4:
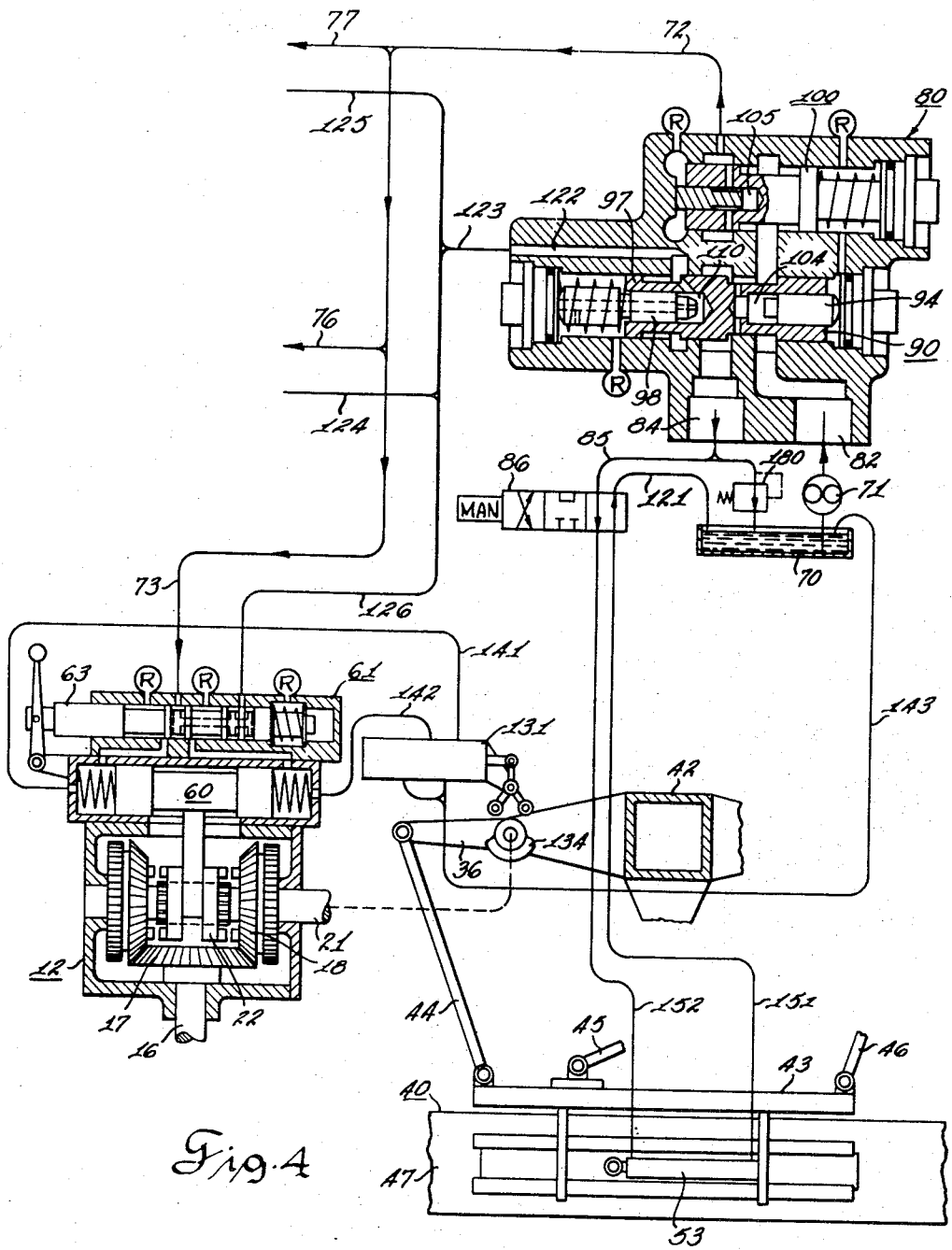
FIG. 4 shows the pressure regulator limiting pressure to the jaw clutch control circuits to an intermediate pressure level and delivering pressure fluid to the side shift control valve at a high pressure level.

When the pressure in conduit 72 reaches the intermediate level of about 450 psi, the force exerted by the pressurized fluid in chamber 105 against spool 101 overcomes the opposing force of the spring 103 and causes the spool 101 to move to the right to its closed position (as shown in FIG. 4). This prevents control valves 61, 78 and 79 from being subjected to pressures in excess of 450 psi. During operation of the control box 12 some fluid will flow through bleed passage 128; however, the pressure limit valve 100 will periodically open to maintain the pressure level at about 450 psi. Upon closing of the pressure limit valve 100, the pump delivery pressure will increase and the unloading valve 90 will open to bypass fluid at about 500 psi. This is achieved by making the bore 99 slightly larger than the bore 111. For instance, if the force of the spring 93 is 50 pounds and the bores 99, 111 have effective pressure areas of 0.5 and 0.4 square inches, respectively, it will be seen that at 500 psi the spool 92 will be biased to the right by a force of 250 pounds (50 pounds force by spring 93 and 200 pounds force from pressure in chamber 110), and the force exerted against the spool 92 in the opposite direction by fluid pressure in chamber 104 will equal 250 pounds.

Figure 3:
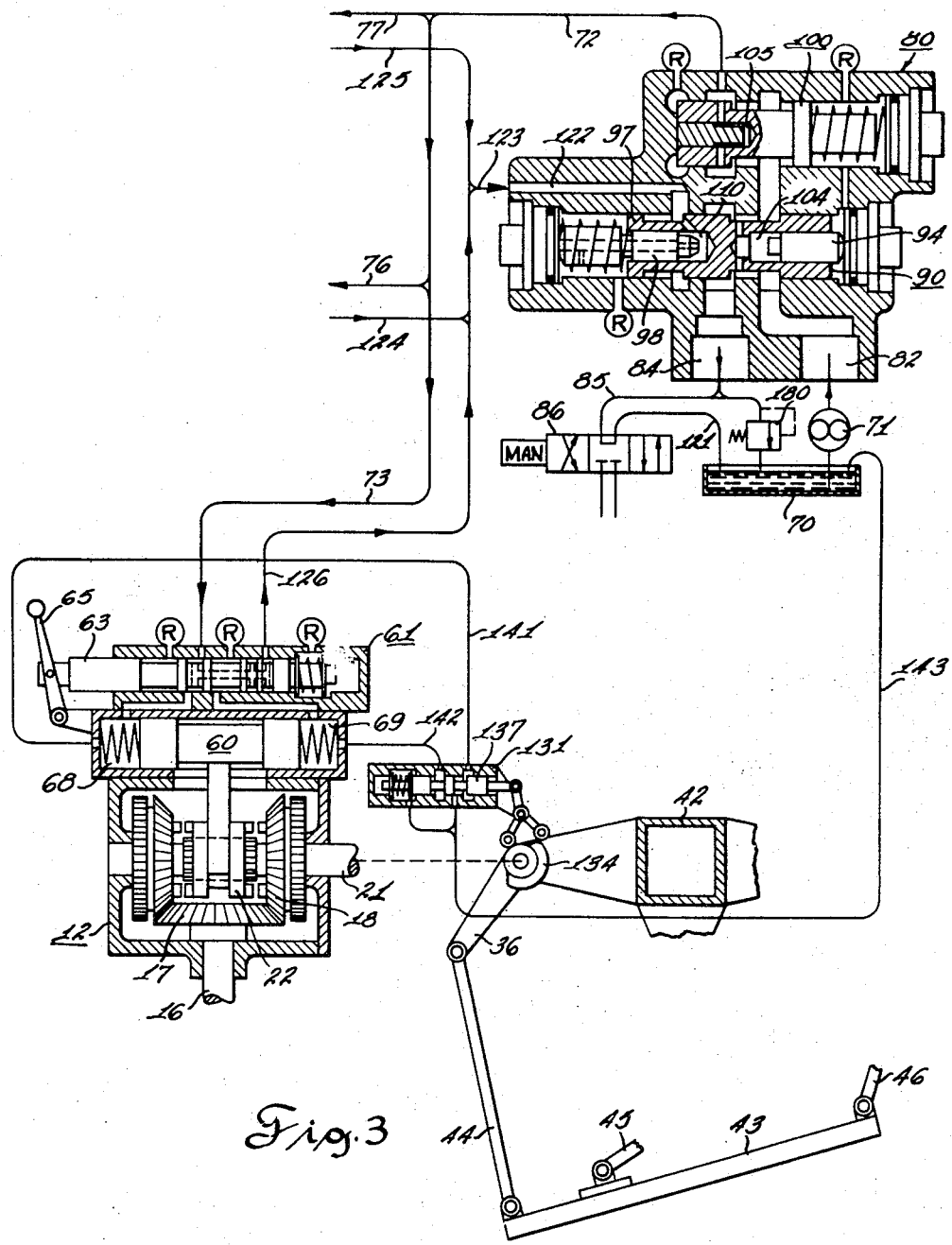
FIG. 3 shows a jaw clutch control valve in an operating position, and the earthworking apparatus at a limit position wherein a dumping valve is actuated.

When the lift arm 36 has been moved counterclockwise to a limit position, as shown in FIG. 3, the cam 134 moves the spool 137 of dumping valve 131 to the left to dump fluid from chamber 68 to reservoir 70 via conduit 141 and return line 143. With the control valve 61 still in an operating position, as shown in FIG. 3, the pressure in conduits 126, 123, in passage 122 and in chamber 110 will be reduced, thereby allowing the unloading valve 90 of regulator 80 to bypass fluid to port 84 at a low pressure. The reduced fluid pressure in the chamber 68 allows the centering spring in the chamber 69 to move the piston back to neutral, thereby disengaging the jaw clutch connection between sleeve 22 and gear 18.

FIG. 4 illustrates the control valve 61, 78, 79 in neutral, the pressure limiting valve 100 closed, the unloading valve 90 open to supply fluid to jack 53 through valve 86 at a high pressure level of 1450 psi established by a relief valve 180. The pressure limiting valve 100 prevents the control valves from being subjected to pressure greater than 450 psi.

From the foregoing description, it is apparent that a unique fluid control system has been provided for a plurality of position adjusting mechanisms for earthworking apparatus 40. An unloading valve 90 in regulator 80 bypasses fluid at a low pressure level when the closed center control valves 61, 78, 79 are in neutral. The unloading valve 90 bypasses fluid at an intermediate pressure level when any one of the valves 61, 78, 79 is in an operating position unitl the position adjusting mechanism has reached a limit position, at which point an associated dumping valve is opened.

The higher unloading pressure function of the unloading valve 90 is achieved by hydraulic biasing means 97, 98 which is connected with the control valves 61, 78, 79 to receive pressurized fluid therefrom only when one or more are moved to an operating position. A single unloading valve 90 is used for a plurality of parallel connected closed center control valve circuits.

Fluid bypassed by the unloading valve 90, may be used for auxiliary functions such as operating the side shift jack 53 for blade 47. The moldboard side shift control circuit includes an open center valve 86 and relief valve 180 which operates at a high pressure level, during which the pressure limiting valve 100 performs its function of preventing pressure in the control box circuits from exceeding an intermediate pressure level.

It will be seen that if the pressure delivered by the pump 71 does not exceed the intermediate pressure level, the unloading valve 90 will not open to its bypass position and the control valve circuits for control boxes 12, 13, 14 will have priority over the auxiliary valve 86.

The embodiments of the invention in which an exclusive property or privilege is claimed are defined as follow:

1. In a hydraulic control system for a road grader of the type having a plurality of position adjusting mechanisms for a blade assembly controlled by closed center control valves, respectively, an automatic pressure regulator, comprising:
    an unloading valve including
        a housing having
            a bore and
            an inlet passage connected to said bore and adapted for connection to a source of pressurized fluid,
        a flow control element in said bore shiftable between closed and bypass positions,
        spring means urging said flow control element toward said closed position,
        a first hydraulic actuator in fluid communication with said inlet passage and acting on said flow control element to urge said flow control element to said bypass position upon the inlet passage pressure reaching a first pressure level, and
        a second hydraulic actuator adapted for connection to said control valves and acting on said flow control element to move it to said closed position when said pressure delivered by any one of said control valves reaches a second pressure level which substantially exceeds said first pressure level, and
    a pressure limiting valve including
        a housing,
        a bore in said housing,
        an inlet port to said bore in said housing adapted to communicate with a source of pressurized fluid,
        an outlet port connected to said bore and adapted for connection in fluid delivery relation to said control valves,
        a flow control spool shiftable between open and closed positions,
        spring means biasing said spool toward its open position, and
        hydraulic pressure responsive actuating means subject to pressure delivered to said control valves and acting on said flow control spool to shift it to its closed position upon the pressure of fluid delivered to said control valves exceeding a predetermined pressure substantially that of said second pressure level.

2. The invention of claim 1 wherein said predetermined pressure is slightly below said second pressure level.

* * * * *